United States Patent Office 2,996,540
Patented Aug. 15, 1961

2,996,540
PREPARATION OF PARA-HYDROXY-BENZOIC ACID
Irwin A. Pearl, Appleton, Wis., assignor, by mesne assignments, to Sulphite Products Corporation, Appleton, Wis., a corporation of Wisconsin
No Drawing. Filed July 30, 1956, Ser. No. 600,652
3 Claims. (Cl. 260—521)

The present invention relates generally to the preparation of para-hydroxybenzoic acid, and more specifically to an inexpensive manner of producing para-hydroxybenzoic acid from what has heretofore been considered waste materials.

Para-hydroxybenzoic acid is widely used in large amounts in polymerization and co-polymerization reactions in the commercial manufacture of plastics, and in the commercial manufacture of dyes and fungicides. Further, certain of its esters, i.e. ethyl and propyl parahydroxybenzoates, possess anesthetic and antiseptic properties, and are also widely used as preservatives.

Heretofore, para-hydroxybenzoic acid has been prepared by a relatively complicated synthesis. As a result, the compound is in somewhat limited supply and available only at a relatively high price. Accordingly, it is a principal object of this invention to provide a process which may be simply performed, which employs inexpensive materials, and which will provide large amounts of para-hydroxybenzoic acid at a reasonable price.

It is well known that wood contains thousands of complex organic compounds in varying amounts. In the ordinary chemical or semi-chemical pulping processes employed in making paper or other cellulosic products, these compounds are separated from the cellulosic fibers in the digestion or cooking process. These compounds are contained in the spent cooking liquor either as solubles or as thoroughly emulsified solids. The solids both in solution and in suspension in the cooking liquor include sugars, aldehydes, phenols, esters and ethers or derivatives thereof. The foregoing compounds are ordinarily very complex and are present in such a complex mixture that in order to recover relatively simple compounds from the waste liquor, it is necessary to subject it to relatively involved reactions such as oxidation-reduction reactions or the like, which may require expensive reagents or complicated processes.

I have discovered, however, that para-hydroxybenzoic acid may be obtained by the hydrolysis of aspen woods, e.g. *Populus grandidentata* (big tooth aspen), *Populus tremuloides* (quaking aspen), *Populus tremula* (European aspen), etc. Convenient and inexpensive sources of hydrolyzed aspen wood extractives are the spent cooking liquors from the chemical or semi-chemical pulping of aspen woods.

The para-hydroxybenzoic acid may be recovered from the cooking liquors of many of the common pulping processes, i.e. the acid or the neutral sulfite processes, the kraft or sulfate process, and the soda process. The reasons for the presence of the relatively large amounts of para-hydroxybenzoic acid in these liquors in readily recoverable state is not wholly understood. As will hereinafter be pointed out, the recovery of para-hydroxybenzoic acid may be enhanced by the conditioning of certain liquors with alkali prior to the employment of the recovery process for para-hydroxybenzoic acid.

Generally, my process involves treating the pulping liquor used in digesting one of the varieties of aspen wood with acid so as to produce an acidified liquor having a pH of less than about 6.5 and preferably less than 6.0. Of course, in the case of the acid sulfite process no acidification is necessary since the liquor naturally has a pH of approximately 2.0.

The acidified liquor is then subjected to extraction with a water immiscible organic solvent for para-hydroxybenzoic acid, for example ethyl or other ethers, ethyl acetate, trichloroethylene, chloroform, benzene, or water immiscible alcohols such as butanol or pentanol. The water immiscible solvent is then extracted with an aqueous alkaline solution which is maintained at a pH within the range of from about 7.2 to 9.5. It has been found that in this pH range that the solution of the unwanted phenolic compounds and other undesirable compounds, which are in solution in the water immiscible solvent, is almost completely suppressed.

Para-hydroxybenzoic acid in almost pure form can then be recovered from the alkaline solution by acidification of the solution and extraction of the acidified solution with a water immiscible solvent which may be evaporated to produce a high yield of para-hydroxybenzoic acid. In the alternative, the acidified solution containing the para-hydroxybenzoic acid may be concentrated to effect the precipitation of the para-hydroxybenzoic acid in the form of crystals. This latter procedure requires that the salt in the acidified solution is of such character that it will remain in solution until after a substantial yield of para-hydroxybenzoic acid is precipitated. It has been found that sodium, potassium, and ammonium salts are all satisfactory. If the alkaline solution includes a cation which might produce an insoluble salt upon acidification it should be acidified with an acid which will produce a soluble salt. For example, with a calcium salt, the solution should be acidified with an acid which will produce a soluble salt thus, such an acid as hydrochloric acid would produce $CaCl_2$.

The yield of para-hydroxybenzoic acid may be greatly enhanced in the case of acidic cooking liquors e.g. acid sulfite liquors, if the liquor before extraction with the immiscible solvent is first hydrolyzed by heating in the presence of a strong caustic material such as caustic soda, potash or lime. This may be accomplished by adding about 4 percent by weight of sodium hydroxide to the cooking liquor and boiling it for a period of about 6 hours. After this hydrolysis the solution is acidified to a pH of less than about 6.5, after which the acidified liquor is treated as outlined in the foregoing. It has been found that this preliminary caustic treatment greatly increases the yield of the para-hydroxybenzoic acid. In one series of tests it has been found that this preliminary treatment doubled the yield of the para-hydroxybenzoic acid.

In the following paragraphs there are described several specific examples of typical manners of carrying out the invention.

*Example I*

In this example I employ as a starting material spent cooking liquor from the acid sulfite digestion of aspen wood (mixed *Populus tremuloides* and *Populus grandidentata*) in a paper making process. The liquor contains about 11.4 percent total solids (both dissolved and suspended) and has a pH of about 2.0. This liquor which is already in an acidic condition is extracted in a liquid-to-liquid extractor with ethyl ether. After the ether has dissolved all of the ether-soluble materials, it is found that it contains approximately 21 parts by weight of extractives for each 10,000 parts by weight of original waste liquor (this liquor originally contained about 1140 parts by weight of total solids).

The ether extract is then subjected to extraction with an 8 percent by weight aqueous solution of sodium bicarbonate which has a pH of about 7.8. The sodium bicarbonate extract is then acidified with dilute sulfuric acid to a pH of 2.5 and the acidified solution is then extracted with ethyl ether. The resultant ether extract is then evaporated to yield approximately 8 parts by weight of crude para-hydroxybenzoic acid melting in the range of 204–210° C. Recrystallization of the crude para-hydroxybenzoic acid from water yields substantially pure para-hydroxybenzoic acid melting at 210-211° C.

*Example II*

In this example I employ a spent acid sulfite liquor similar to that used in Example I. To the liquor which is at a pH of about 2.0 there is added 4 percent by weight of sodium hydroxide. The liquor is then boiled for approximately 6 hours, this treatment effecting hydrolysis of certain of the organic materials.

After this treatment with sodium hydroxide, the resultant solution is acidified with sulfuric acid to lower the pH to about 2.5. The acidified liquor is then subjected to extraction in a continuous liquid-liquid extractor with ethyl ether. After the ether has dissolved all of the ether-soluble materials it is found that it contains approximately 50 parts by weight of extractives for each 10,000 parts by weight by original waste. (The liquor originally contained about 1140 parts by weight of total solids.) The ether extract is then subjected to extraction with an 8 percent by weight aqueous solution of sodium bicarbonate having a pH of about 7.8. The sodium bicarbonate extract is then acidified with hydrochloric acid to a pH of 2.5. The acidified extract is then concentrated and since the para-hydroxybenzoic acid is only slightly soluble in acidified aqueous solution, parahydroxybenzoic acid crystals precipitate from the concentrated extract. Approximately 16 parts by weight of crude para-hydroxybenzoic acid is recovered.

*Example III*

A quantity of spent cooking liquor from the neutral sulfite digestion of the aspenwood (mixed *Populus tremuloides* and *Populus grandidentata*) in a paper making process is used in this example. The liquor contains approximately 10 percent solids and has a pH of about 6.5. This liquor is first acidified with sulfuric acid to a pH of about 2.5 and subsequently is subjected to extraction in a continuous liquid-liquid extractor with chloroform. After the chloroform has dissolved all the chloroform-soluble materials it is found that it contains approximately 20 parts by weight of chloroform extractives for each 10,000 parts by weight of original neutral sulfite waste liquor. The chloroform extract is then subjected to extraction with an aqueous citric acid-disodium phosphate buffer solution having a pH of about 8.0. This aqueous extract is then acidified by dilute hydrochloric acid to a pH of 2.5 and the acidified solution is then extracted with chloroform. The resultant chloroform extract is evaporated to yield crystals of crude para-hydroxybenzoic acid.

*Example IV*

Spent black liquor from the kraft digestion of aspenwood (mixed *Populus tremuloides* and *Populus grandidentata*) in a kraft paper making process, containing 16 percent solids and having a pH of about 14, is acidified to a pH of 2.5 by the addition of dilute sulfuric acid. The acidified black liquor is then subjected to extraction in a continuous liquid-liquid extractor with ethyl ether.

The ethyl ether is found to contain approximately 15 parts by weight of extractives for each 10,000 parts by weight of original liquor. The ether extract is then subjected to extraction with an 8 percent by weight aqueous solution of sodium bicarbonate having a pH of about 7.8. The sodium bicarbonate extract is then acidified with hydrochloric acid to a pH of 2.5. This extract is then concentrated to effect the crystallization of para-hydroxybenzoic acid which crystals precipitate out of the concentrated solution and are recovered.

Various of the features of the invention believed to be new are set forth in the appended claims.

I claim:

1. A process of preparing para-hydroxybenzoic acid which comprises treating an acidified liquor which has been used in the digestion of aspenwood in a pulping process and having a pH of less than 6.5 with a water immiscible organic solvent for para-hydroxybenzoic acid so as to extract materials including para-hydroxybenzoic acid, extracting the resultant solvent solution with an aqueous solution at a pH within the range of from about 7.2 to about 9.5 and recovering the para-hydroxybenzoic acid from the aqueous solution.

2. A process of preparing para-hydroxybenzoic acid which comprises treating an acidified liquor which has been used in the digestion of aspenwood in a pulping process and having a pH of less than 6.0 with a water immiscible organic solvent for para-hydroxybenzoic acid so as to extract materials including para-hydroxybenzoic acid, extracting the resultant solvent solution with an aqueous alkaline solution at a pH within the range of from about 7.2 to about 9.5, subsequently acidifying the alkaline solution with an acid which forms a soluble salt with the cations in the alkaline solution, concentrating the acidified solution to precipitate para-hydroxybenzoic acid and recovering the para-hydroxybenzoic acid.

3. A process of preparing para-hydroxybenzoic acid which comprises hydrolyzing a liquor which has been used in the digestion of aspenwood by the acid sulfite process with a caustic material, acidifying the hydrolyzed liquor to lower the pH to below about 6.0, treating the acidified liquor with a water immiscible organic solvent for para-hydroxybenzoic acid so as to extract materials including para-hydroxybenzoic acid, extracting the resultant solvent solution with an aqueous alkaline solution at a pH within the range of from about 7.2 to about 9.5, subsequently acidifying the alkaline solution with an acid which forms a soluble salt with the cations in the alkaline solution, concentrating the acidified solution to precipitate para-hydroxybenzoic acid and recovering the para-hydroxybenzoic acid.

References Cited in the file of this patent

UNITED STATES PATENTS 2,556,213     Pierotti et al. _____ June 12, 1951

OTHER REFERENCES

Suida et al.: Chem. Abst., 37, page 3590 (1943).

Raff: Canadian Chem. and Process Ind., page 37, January 1949.